United States Patent [19]

Roof, Sr. et al.

[11] Patent Number: 4,758,101
[45] Date of Patent: Jul. 19, 1988

[54] BEARING MOUNTING

[75] Inventors: Norman L. Roof, Sr., Pittsford; Stephen J. Csaszar, Jr., Sodus; Delbert N. Dewald, Fairport; Patrick T. Ferrari, Macedon; John D. Gramlich; David C. Irving, both of Webster; Leslie R. Kilian, Penfield; Kenneth P. Moore, Rochester; Richard F. Scarlata, Rochester; Joseph S. Vetromile, Rochester, all of N.Y.

[73] Assignee: Xerox Corporation, Stamford, Conn.

[21] Appl. No.: 49,197

[22] Filed: May 13, 1987

[51] Int. Cl.$^4$ .............. F16C 43/00; F16C 35/07; F16M 13/00
[52] U.S. Cl. .................. 384/537; 248/558; 384/428; 384/535; 403/4
[58] Field of Search .......... 384/247, 252-260, 384/275, 295, 296, 433, 519, 624, 627, 907-911, 277, 476, 428, 438, 439-446, 456, 490, 492, 510, 513, 535-537, 539, 559, 581-585, 192, 220, 222; 403/4, 3, 26; 248/558; 223.4, 224.4; 220/287

[56] References Cited

U.S. PATENT DOCUMENTS

| 1,490,869 | 4/1924 | Volz | 220/287 X |
|---|---|---|---|
| 2,868,594 | 1/1959 | Leister | 384/428 X |
| 2,873,151 | 2/1959 | Leister | 384/192 X |
| 3,482,890 | 12/1969 | Burrell | 384/252 X |
| 3,740,107 | 6/1973 | Fromme | 384/536 |
| 3,751,122 | 8/1973 | Dubay | 384/296 |
| 3,797,182 | 3/1974 | Eichstaedt | 403/3 X |
| 3,904,731 | 9/1975 | Orkin et al. | 264/242 |
| 3,957,278 | 5/1976 | Rabe | 277/227 |
| 3,998,505 | 12/1976 | Frost et al. | 384/510 |
| 4,048,370 | 9/1977 | Orkin et al. | 428/323 |
| 4,054,334 | 10/1977 | McAllister et al. | 384/484 |
| 4,065,216 | 12/1977 | Nelson | 403/4 |
| 4,153,130 | 5/1979 | Hacker | 220/287 |
| 4,163,503 | 8/1979 | McKinnon | 220/287 X |
| 4,247,512 | 1/1981 | Lobeck et al. | 264/242 |
| 4,339,374 | 7/1982 | Olschewski et al. | 384/576 X |
| 4,423,540 | 1/1984 | Hishida | 29/460 |
| 4,530,609 | 7/1985 | Jasperse et al. | 384/515 |
| 4,542,996 | 9/1985 | Brissette et al. | 384/536 |
| 4,643,594 | 2/1987 | Neder et al. | 384/478 |

FOREIGN PATENT DOCUMENTS

| 591032 | 1/1960 | Canada | 384/536 |
| 171121 | 10/1982 | Japan | 384/490 |

Primary Examiner—John Petrakes
Assistant Examiner—Thomas R. Hannon
Attorney, Agent, or Firm—H. Fleischer; J. E. Beck; R. Zibelli

[57] ABSTRACT

A mounting which supports a bearing in a machine frame. The mounting is molded with the bearing being molded integrally therewith in an aperture therein. The outer race of the bearing is in molded non-rotative engagement with the mounting. The mounting has a plurality of mounting supports. At least one of the mounting supports is adapted to be received by the frame.

28 Claims, 3 Drawing Sheets

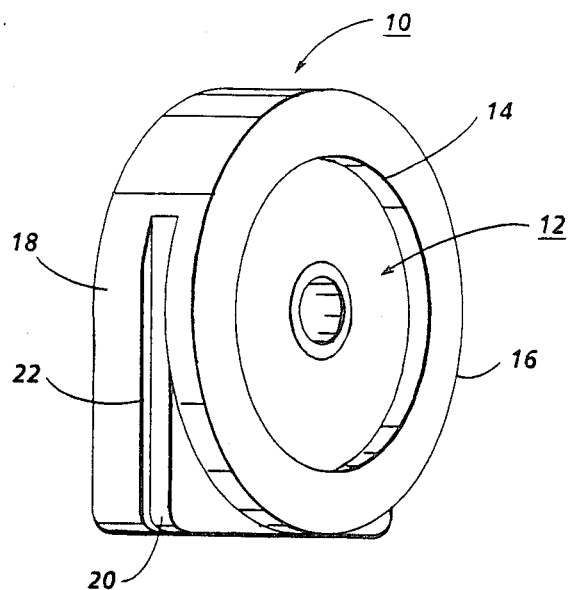
FIG. 1
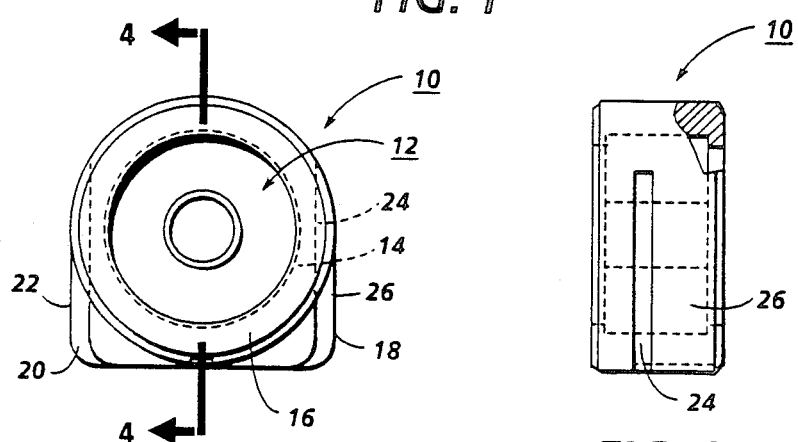
FIG. 2
FIG. 3
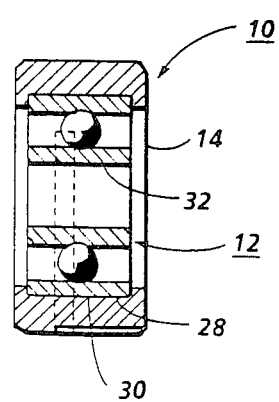
FIG. 4

BEARING MOUNTING

This invention relates generally to a bearing mounting, and more particularly concerns a molded mounting arranged to support a bearing in a frame and being adapted to prevent damage to the frame in the event of bearing failure.

It is common practice to mount a bearing in the frame of a machine or apparatus to support a rotary shaft. This arrangement has a significant disadvantage in that a bearing failure frequently results in a frame failure as well. A frame failure requires extensive repair procedures and expensive levels of assembly field replacements. The type of failure most frequently encountered in the bearing mounting frame was due to fretting or abrasion wear resulting from rotation of the bearing outer race with respect to the mounting frame. Existing designs for bearing mountings have only one configuration for mounting the bearings onto the frame and are of a two piece construction. The installation and removal of shaft assemblies, in this type of mounting, are frequently difficult and require excessive operator time. Moreover, these designs result in frequent breakage during installation. It is also highly desirable to employ a bearing block which readily lends itself to automated assembly. Thus, the mounting should be designed to minimize fretting wear, and, in the event of catastrophic bearing failure, act as a sacrificial element to protect the machine frame.

Various types of bearings and mountings have been developed. The following disclosures appear to be relevant:

U.S. Pat. No. 3,904,731, Patentee: Orkin et al., Issued: Sept. 9, 1975

U.S. Pat. No. 3,957,278, Patentee: Rabe, Issued: May 18, 1976

U.S. Pat. No. 4,048,370, Patentee: Orkin et al., Issued: Sept. 13, 1977

U.S. Pat. No. 4,247,512, Patentee: Lobeck et al., Issued: Jan. 27, 1981

U.S. Pat. No. 4,423,540, Patentee: Hishida, Issued: Jan. 3, 1984

U.S. Pat. No. 4,643,594, Patentee: Neder et al., Issued: Feb. 17, 1987

The relevant portions of the foregoing disclosures may be briefly summarized as follows:

Orkin et al. ('731) and Orkin et al. ('370) disclose injection molded, self lubricating bearing assemblies capable of absorbing radial, axial and moment loading individually or in combination. One of the two engaging members has a surface made of metal or ceramic and the other engaging member surface is a cured mixture of an acrylate composition and particulate polytetrafluoroethylene. The acrylate composition remains a liquid until deprived of oxygen or raised in temperature. This permits low injection pressures to be used for molding.

Rabe describes an injection molded seal and method for production thereof. The seal is made from an injection molded material with a sealing lip support integral with a sealing lip. Materials for the sealing lip and its support are bonded in a hot plastic state under controlled temperature and pressure. This produces a transition area between the sealing lip and its support with no distinct separation of the two.

Lobeck et al. discloses a method for forming a bushing with a plastic ball wherein liquid plastic is flowed into an annular space between an outer race and an inner mold where it solidifies and shrinks forming a clearance allowing movement of a plastic bearing.

Hishida describes a method of manufacturing a bearing housing in which two bearings are aligned with each other to support a rotary shaft. A male and female mold are used and fluid synthetic resin is injected into a cavity formed between the two molds to form the bearing housing.

Neder et al. discloses a sealed rolling bearing in which a sealing lip and sealing projection form a conical, outwardly directed centrifugal surface which ejects moisture and dirt through a gap seal. The seal consists of the sealing lip, projection and a sealing body.

In accordance with one aspect of the present invention, there is provided a device for supporting a shaft rotatably in a frame. The device includes a molded member having an aperture therein. The member has a plurality of mounting supports with at least one of the mounting supports being adapted to be received in the frame. A bearing member is located in the aperture of the molded member. The bearing member has an inner race adapted to support the shaft and rotate substantially in unison therewith and an outer race in molded non-rotative engagement with the molded member.

Pursuant to another aspect of the present invention, there is provided a mounting for supporting a bearing member in a frame. The mounting includes a molded member having an aperture therein. The member has a plurality of mounting supports with at least one of the mounting supports being adapted to be received in the frame. The bearing member is located in the aperture of the molded member and has the outer race thereof in molded non-rotative engagement with the molded member.

Other features of the present invention will become apparent as the followng description proceeds and upon reference to the drawings, in which:

FIG. 1 is a perspective view of a bearing mounting employing the features of the present invention therein;

FIG. 2 is a front elevational view showing the FIG. 1 bearing mounting;

FIG. 3 is a side elevational showing the FIG. 1 bearing mounting;

FIG. 4 is a sectional, elevational view taken along the line 4—4 in FIG. 2;

Figure 5:
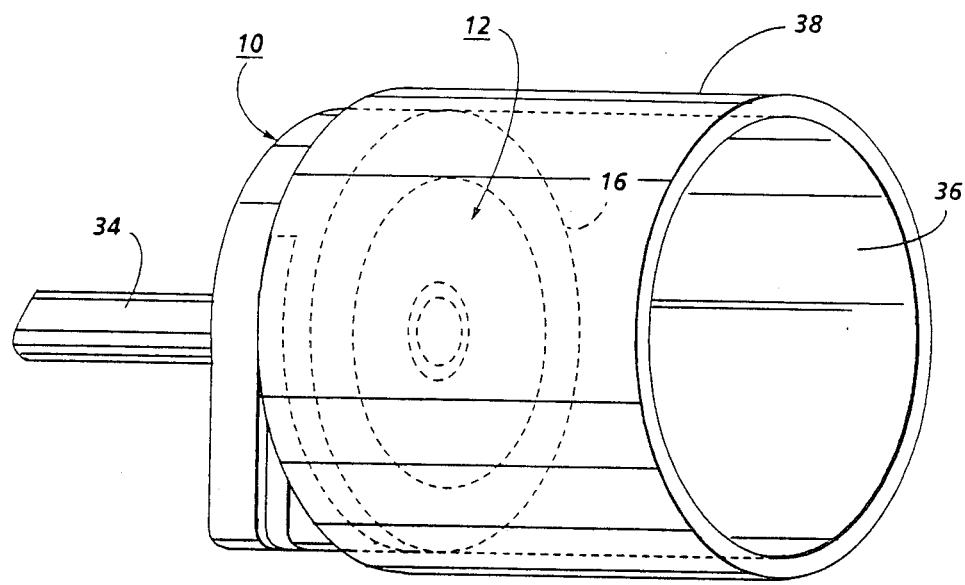
FIG. 5 shows the FIG. 1 bearing mounting mounted in a cylindrical frame and supporting a shaft rotatably.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Referring now to FIG. 1, there is shown a perspective view of the bearing mounting, indicated generally by the reference numeral 10, with a bearing, indicated generally by the reference numeral 12, having its' outer race in molded non-rotative engagement therewith. Bearing 12 is automatically inserted into the mold and the bearing mounting material is injected therein. Upon curing, the bearing mounting, with the bearing molded integrally therewith is removed from the mold. In this way, mounting 10 is molded around the outer race of bearing 12 in such a way as to capture it. This prevents axial movement of the bearing relative to the mounting. Without this design feature, the mounting would creep under the induced stress. This would, in time, result in axial separation of the bearing from the mounting. Bearing mounting 10 has an aperture or circular hole 14 extending therethrough for holding bearing 12 therein. Bearing mounting 10 is adapted to be mounted in the frame of a machine. The inner race of bearing 12 is adapted to support rotatably a shaft. The shaft is press fit into the inner race of bearing 12 to rotate in unison therewith. One surface of bearing mounting 10 has a cylindrical region 16 extending outwardly therefrom. The other surface, opposed from cylindrical region 16, has a D-shaped region 18 extending outwardly therefrom. This enables bearing mounting 10 to be mounted either in a circular opening in the frame by using cylindrical region 16 as the mounting region, or in a D-shaped opening in the frame by using D-shaped region 18 as the mounting region. In addition, bearing mounting 10 has a slot 20 on surface 22 and a slot (not shown) on the surface opposed thereto. These surfaces are perpendicular to the surfaces from which cylindrical region 16 and D-shaped region extend outwardly from. These slots may interfit into a clip which, in turn, is mounted on the machine frame, or clip into the frame directly as a mounting surface. The various mounting arrangements will be discussed hereinafter in greater detail with reference to FIGS. 5 through 7, inclusive.

With continued reference to FIG. 1, by choosing the material for bearing mounting 10, the bearing mounting can range from highly nonconductive to being electrically conductive. The bearing mounting can be made from any thermoplastic, reinforced thermoplastic or thermoset material. Preferably, bearing mounting 10 is made from a polyamide containing 15% by weight of carbon fibers therein and 25% by weight of glass fibers therein. This material results in low hoop stress after molding and has good creep and solvent resistance, and good dimensional stability. In addition, this material is electrostatically dissipative. Other materials which may be employed are an acetal resin, a glass filled polycarbonate, a glass filled polyester, a thermoplastic elastomer, a polyamide containing 30% by weight of carbon fibers, and a polyamide containing 50%, by weight, of glass fibers. All of these materials readily lend themselves to being molded so as to form bearing mounting 10 as a unitary member.

Turning now to FIG. 2, there is shown a front elevational view of bearing mounting 10. As shown thereat bearing 12 is mounted and captured in hole 14. Cylindrical region 16 extends outwardly from one surface of bearing mounting 10. D-shaped region 18 extends outwardly from the outer surface thereof. Slot 20 is formed in surface 22. Slot 24 is formed in surface 26. Surfaces 22 and 26 are opposed from one another and perpendicular to the surfaces of cylindrical region 16 and D-shaped region 18.

FIG. 3 more clearly shows slot 24 molded in surface 26 of bearing mounting 10. Slots 24 and 20 are substantially identical to one another. Thus, one slot is provided on each side of the bearing mount. The slots are designed to accept a variety of sheet metal retaining clips.

Referring now to FIG. 4, bearing 12 is shown molded integrally in bearing mounting 10. As depicted thereat, outer race 28 is molded in non-rotative engagement with the interior surface 30 of bearing mounting 10. In this way, mounting 10 is molded around the outer race of bearing 12 in such a way as to capture it. This prevents axial movement of the bearing relative to the mounting. Bearing 12 is a ball bearing with the inner race 32 being adapted to support rotatably a shaft. By way of example, bearing 12 may be a single row, ABEC 1 radial ball bearing.

FIG. 5 illustrates bearing mounting 10 supporting a shaft 34 mounted in bearing 12. Bearing mounting 10 is mounted with cylindrical region 16 being interfit into a circular hole 36 in frame 38.

Figure 6:
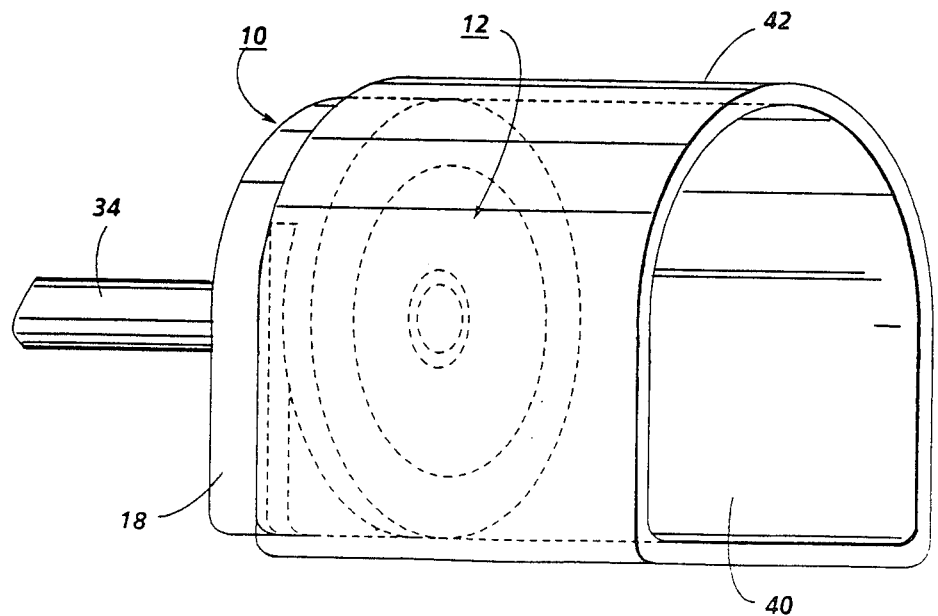
FIG. 6 shows the FIG. 1 bearing mounting mounted in a D-shaped frame and supporting a shaft rotatably.

Turning now to FIG. 6, there is shown bearing mounting 10 supporting a shaft 34 mounted in bearing 12. Bearing mounting 10 is mounted with D-shaped region 18 being interfit into a D-shaped hole 40 in frame 42. The D-shaped mounting arrangement prevents rotation of bearing mounting 10.

Figure 7:
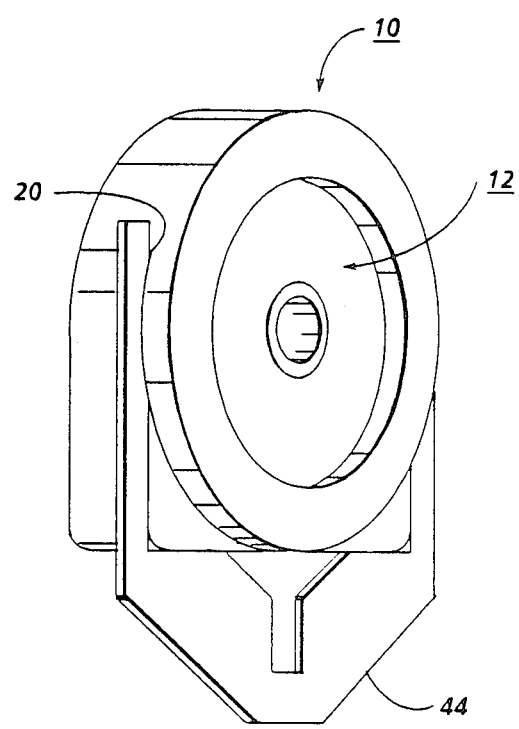
FIG. 7 shows the FIG. 1 bearing mounting having a clip mounted thereon for axial location and retention in a frame.

Finally, FIG. 7 shows bearing mounting 10 with bearing 12 molded integrally therewith. A retaining clip 44 is interfit in slots 20 and 22 of mounting 10. Clip 44 is, in turn, mounted on the machine frame. Clip 44 provides axial location and retention of bearing mounting 10. Generally only one bearing mounting, supporting one end of a shaft, is secured by a retaining clip. The bearing mounting supporting the other end of the shaft is mounted in a round or D-shaped hole in the frame.

Bearing mounting 10 reduces noise by isolating the rotating, noise producing components from the frame conponents which can resonate and amplify them. The bearing mounting minimizes fretting wear to the frame. In the event of catastrophic bearing failure, the bearing mounting acts as a sacrificial element and protects the machine frame. Abrasive wear from bearing rotation, i.e. radial creep, can be eliminated during mounting by mounting the bearing block in a D-shaped hole, or in a clip which locates in the slots or on the flat of the bearing mounting, or by employing both of the foregoing mounting arrangements.

In recapitulation, it is apparent that the bearing mounting has a plurality of mounting supports with one of the supports being adapted to be received in the frame of the machine. A bearing is located in the opening of the bearing mounting. The bearing has an inner race adapted to support a shaft and rotate in unison therewith. The outer race of the bearing is moulded in non-rotative engagement with the bearing mounting and captured to prevent axial movement.

It is, therefore apparent that there has been provided in accordance with the present invention, a bearing mounting that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A device for supporting a shaft rotatably in a frame, including:
   a molded member having an aperture therein, said member having a plurality of mounting supports with at least one of the mounting supports being adapted to be received in the frame; and a bearing member located in the aperture of said molded member, said bearing member having an inner race adapted to support the shaft and rotate substantially in unison therewith and an outer race in molded non-rotative engagement with said molded member.

2. A device according to claim 1, wherein the outer race of said bearing member is captured to prevent axial movement thereof relative to said molded member.

3. A device according to claim 2, wherein one of the plurality of mounting supports includes a cylindrical region extending outwardly from one surface of said molded member.

4. A device according to claim 3, wherein one of the plurality of mounting supports includes a D-shaped region extending outwardly from the other surface of said molded member.

5. A device according to claim 4, wherein one of the plurality of mounting supports includes a pair of slots, one of the slots being disposed on one side of said molded member and the other slot being disposed on the other side of said molded member with the sides of said molded member being substantially normal to the surfaces thereof.

6. A device according to claim 5, wherein said molded member is a unitary member.

7. A device according to claim 1, wherein said molded member is made from an electrically conductive material.

8. A device according to claim 1, wherein said molded member is made from an electrically nonconductive material.

9. A device according to claim 1, wherein said molded member is made from a polyamide having carbon fibers and glass fibers dispersed therein.

10. A device according to claim 1, wherein said molded member is made from a polycarbonate having glass fibers dispersed therein.

11. A device according to claim 1, wherein said molded member is made from a polyester having glass fibers dispersed therein.

12. A device according to claim 1, wherein said molded member is made from a polyamide having carbon fibers dispersed therein.

13. A device according to claim 1, wherein said molded member is made from an acetal resin.

14. A device according to claim 1, wherein said molded member is made from a polyamide having glas fibers dispersed therein.

15. A mounting for supporting a bearing member in a frame, including a molded member having an aperture therein, said member having a plurality of mounting supports with at least one of the mounting supports being adapted to be received in the frame said bearing member being located in the aperture of said molded member and having the outer race thereof in molded non-rotative engagement with said molded member.

16. A mounting according to claim 15, wherein the outer race of said bearing member is captured to prevent axial movement thereof relative to said molded member.

17. A mounting according to claim 16, wherein one of the plurality of mounting supports includes a cylindrical region extending outwardly from one surface of said molded member.

18. A mounting according to claim 17, wherein one of the plurality of mounting supports includes D-shaped region extending outwardly from the other surface of said molded member.

19. A mounting according to claim 18, wherein one of the plurality of mounting supports includes a pair of slots with one of the slots being disposed on one side of said molded member and the other slot being disposed on the other side of said molded member with the sides of said molded member being substantially normal to the surfaces thereof.

20. A mounting according to claim 15, wherein said molded member is a unitary member.

21. A mounting according to claim 15, wherein said molded member is made from an electrically conductive material.

22. A mounting according to claim 15, wherein said molded member is made from an electrically nonconductive material.

23. A mounting according to claim 15, wherein said molded member is made from a polyamide having carbon fibers and glass fibers dispersed therein.

24. A mounting according to claim 15, wherein said molded member is made from a polycarbonate having glass fibers dispersed therein.

25. A mounting according to claim 15, wherein said molded member is made from a polyester having glass fibers dispersed therein.

26. A mounting according to claim 15, wherein said molded member is made from a polyamide having carbon fibers dispersed therein.

27. A mounting according to claim 15, wherein said molded member is made from an acetal resin.

28. A mounting according to claim 15, wherein said molded member is made from a polyester having glass fibers dispersed therein.

* * * * *